United States Patent [19]

Schoening et al.

[11] Patent Number: 4,587,082

[45] Date of Patent: May 6, 1986

[54] PASSAGE THROUGH THE WALL OF A REINFORCED CONCRETE PRESSURE VESSEL

[75] Inventors: Josef Schoening, Hambruecken; Hans-Georg Schwiers, Ketsch, both of Fed. Rep. of Germany

[73] Assignee: Hochtemperatur-Reaktorbau GmbH, Cologne, Fed. Rep. of Germany

[21] Appl. No.: 556,075

[22] Filed: Nov. 30, 1983

Related U.S. Application Data

[63] Continuation of Ser. No. 285,051, Jul. 20, 1981, abandoned.

[30] Foreign Application Priority Data

Aug. 8, 1980 [DE] Fed. Rep. of Germany ......... 300302

[51] Int. Cl.$^4$ .......................... G21C 13/02; G21F 3/00
[52] U.S. Cl. .................................. 376/291; 376/203; 376/287; 376/292; 250/515.1; 52/220; 52/302
[58] Field of Search ............... 376/291, 292, 287, 288, 376/289, 394, 260, 295, 296, 203, 204, 391, 393, 383; 250/515.1, 517.1, 518.1; 52/302, 303, 305, 220, 221, 224

[56] References Cited

U.S. PATENT DOCUMENTS

| | | | |
|---|---|---|---|
| 2,942,116 | 6/1960 | Alelrod | 250/517.1 |
| 2,957,210 | 10/1960 | Levenson | 250/515.1 |
| 3,085,464 | 4/1963 | Touvay | 250/517.1 |
| 3,147,189 | 9/1964 | Barabach et al. | 376/287 |
| 3,283,156 | 11/1966 | Mazza | 250/517.1 |
| 3,356,588 | 12/1967 | Beliaev | 376/289 |
| 3,379,616 | 4/1968 | Vetry | 376/289 |
| 3,393,485 | 7/1978 | Wright | 52/305 |
| 3,713,459 | 1/1973 | McIver et al. | 52/224 |
| 3,733,760 | 5/1973 | Koerner | 376/394 |
| 3,798,909 | 3/1974 | Oakes | 376/292 |
| 3,914,843 | 10/1975 | Antonacci | 52/220 |
| 4,035,232 | 7/1977 | Kube | 376/292 |
| 4,236,573 | 12/1980 | Dorling et al. | 376/291 |

FOREIGN PATENT DOCUMENTS

| | | | |
|---|---|---|---|
| 757493 | 3/1971 | Belgium | 376/287 |
| 2154350 | 4/1973 | Fed. Rep. of Germany | 376/292 |
| 2627216 | 1/1977 | Fed. Rep. of Germany | 376/289 |
| 3009827 | 10/1981 | Fed. Rep. of Germany | . |
| 0146089 | 12/1978 | Japan | 376/287 |
| 806984 | 1/1959 | United Kingdom | 376/203 |
| 891708 | 3/1962 | United Kingdom | 376/287 |
| 995003 | 6/1965 | United Kingdom | 250/517.1 |
| 1115476 | 5/1968 | United Kingdom | 376/291 |

OTHER PUBLICATIONS

Atomwirtschaft, 5/71, pp. 238–245.

*Primary Examiner*—Harvey E. Behrend
*Attorney, Agent, or Firm*—Robert J. Koch

[57] ABSTRACT

A passage through a reinforced concrete pressure vessel is provided, wherein the tolerance ranges required for the fastening of the components in the passage may be produced safely and without excessive expenditures. This is achieved by an arrangement including a lining having a first, outer tube resting against the concrete and a second tube arranged within the first tube.

2 Claims, 2 Drawing Figures

PASSAGE THROUGH THE WALL OF A REINFORCED CONCRETE PRESSURE VESSEL

This application is a continuation of application Ser. No. 285,051, filed July 20, 1981, now abandoned.

BACKGROUND OF THE INVENTION

1. Field of the Invention:

The invention concerns a passage through the wall of a reinforced concrete pressure vessel for nuclear reactor installations, in particular, gas cooled nuclear reactor installations. The passage contains a metal liner.

2. Background of the Prior Art:

It is known that during the construction of reinforced concrete pressure vessels a plurality of passages are formed in the pressure vessel walls and lined with armor tubes. The function of such a lining is to insure the gas tightness of such a container wall and to reduce stress peaks in the adjacent orifices. The armor tube is joined in a gas tight manner with the inner liner of the reactor vessel by means of welding. Armor tubes designed in this manner serve to receive structural elements of the reactor such as blowers, steam generators, measuring instruments (thermocouples) and other components required for the operation of the reactor, wherein the internal diameter of the armor tube may attain a value of a few centimeters to several meters. The wall thickness of the armor tube is approximately 5 cm. It is desirable to maintain the small tolerances characterizing the armor tube in the course of its manufacture even after its installation in the wall of the reinforced concrete pressure vessel. It is known that during the setting of the armor tube in concrete, and even for an extended period after the completion of the wall, forces are acting in the wall. These forces lead to the deformation or undesirable alteration of the armor tubes. Over the entire life of the vessel, the tubes are subjected to a constant process of change, wherein the magnitude of the change depends on the state of the operation and the life of the installation. Essentially, it is not possible to coordinate or to affect the deformations as they occur. It is necessary to correct any damage that has taken place prior to the installation in the armor tubes of the components for which they are intended. This operation involves a considerable technical effort and financial expenditure and must either be repeated often, depending on the history of the installation, or in the case of a single fitting, does not represent an optimum solution.

SUMMARY OF THE INVENTION

It is an object of the invention to provide a passage for a reinforced concrete pressure vessel which may be produced within the tolerance ranges required for the fastening of the components safely with respect to execution and without excessive cost.

This object is achieved in keeping with the invention by construction of a passage having a first outer tubular lining in contact with the concrete and a second tubular member arranged within the first tube.

The invention is based on the fact that in an armor tube with an internal diameter larger than is itself necessary, a further tube with the desired internal diameter, may be inserted. The tube with the smaller diameter performs the function of the known armor tube, by serving as the means of fastening for the components to be contained therein. The requirement concerning the first tube joined to the concrete wall is merely that following its setting in concrete, it should not undergo excessive deformation affecting the guide tube itself. Similarly, the distance between the tubes should be such that there is no interference with the installation of the guide tube. This condition is satisfied without difficulty since the maximum deviations from the original and design shape of the armor tube may be estimated. Based on the knowledge that in the arrangement of the guide tube in the armor tube, no indeterminate force effects may be applied by the vessel wall to the guide tube. A correspondingly smaller wall thickness may be used, whereby the small tolerances achieved in the manufacturing process may be preserved. It is known, for example, that the wall thickness of the reinforced concrete pressure vessel amounts to 4 to 5 m. Vessels of this type are disclosed in U.S. Pat. No. 4,175,001, the disclosure of which is incorporated herein. The armor tube and the guide tube arranged in the wall passage must be of the same length. In order to assure the cylindrical configuration of the guide tube over the entire length of the passage, it is appropriate to establish rigid connections at several locations between the first and the second tube. An adequate, gas-tight connection on the inner and the outer side of the vessel wall between the guide tube and the first tube and the liner respectively, is established according to the invention by means of rings or flanges, which are welded to the tubes at the joint locations intended. It is further advisable to arrange several supporting rings inside the tube in order to prevent the bending of the guide tube. The internal diameter of the first tube is larger than the external diameter of the guide tube. The free space generated by the arrangement of the guide tube in the first tube is filled according to the invention with a shielding material. Concrete has been found to be an adequate radiation shielding material.

The advantages provided by the invention include, in particular, the fact that the passage in reinforced concrete pressure vessels makes it possible to satisfy the tolerances required for the fastening of components during the course of construction without excessive expenditures.

BRIEF DESCRIPTION OF THE DRAWINGS

An embodiment of the invention is shown in the drawing and will be described in more detail hereinafter.

In the drawing.

Figure 1:
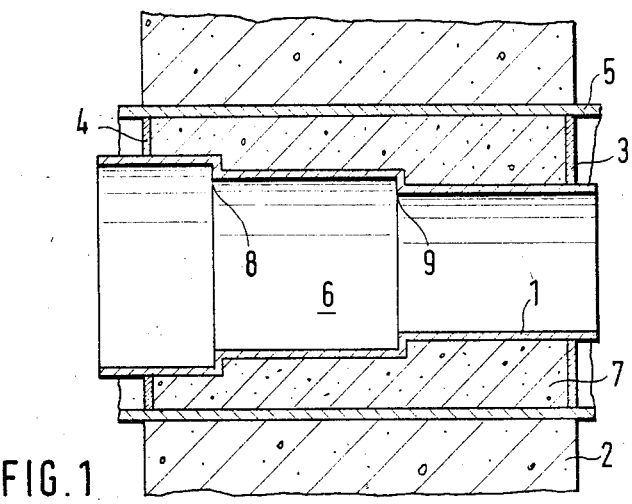
FIG. 1 shows a schematic arrangement of the guide tube in the first tube.

The embodiment of the guide tube 1 shown in FIG. 1 in the reinforced concrete pressure vessel wall 2 is connected with the first tube 5 by means of the rings 3 and 4. In the course of the construction of the passage 6 during the building of the reinforced concrete pressure vessel, the first tube 5 is placed in its intended location in a known manner. The first tube 5 has a larger diameter than the one intended for the passage 6. Following the construction of the entire wall of the reinforced concrete pressure vessel, the guide tube 1 is placed into the first tube 5 and equipped with the rings 3 and 4. The rings 3, 4 establish a rigid connection between the first tube 1 and the guide tube 1. The free space 7 between the first tube 5 and the guide tube 1 is filled with concrete. In order to prevent axial displacements of the guide tube 1, several steps 8 and 9 are formed on the guide tube 1. The guide tube 1 rests against the concrete by means of the steps 8 and 9.

Figure 2:
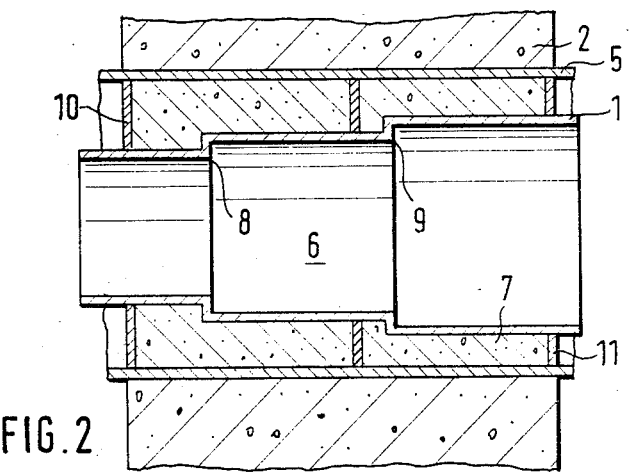
FIG. 2 illustrates another arrangement of the guide tube in the first tube.

The guide tube shown in FIG. 2 tapers in the opposite direction as the guide tube in FIG. 1.

The specification and drawings set forth the preferred embodiments of the invention. It should be noted, however, that the invention is not limited to those specific embodiments and methods specifically disclosed, but extends to all embodiments, substitute and equivalent constructions falling within the scope of the invention as defined by the claims.

We claim:

1. In a gas cooled high temperature reactor having a reinforced concrete pressure vessel and a passage construction for a conduit through the wall of the reinforced concrete pressure vessel, the improvement comprising:

an outer tubular metal liner of a generally cylindrical configuration having a substantially constant diameter in direct contact with the concrete of the reinforced pressure vessel wall and extending through said wall;

an inner tubular member comprising a plurality of axially aligned cylindrical members of different diameter forming a generally stepped, elongate cylindrical passage arranged generally coaxially within said outer tubular metal liner along the entire length of said outer tubular metal liner within and through said passage to define therewith an axially stepped annular space;

solid radiation shielding material disposed within and substantially filling said stepped annular space;

at least two annular ring members rigidly connecting said inner and said outer tubular members; the first of said annular ring members positioned at the inside surface of the pressure vessel and the second of said annular ring members positioned at the outside surface of the pressure vessel;

a third annular ring member in the central portion of said passage; and a welded gas-tight connection between said inner and said outer tubular members and each of said first and second annular ring members.

2. The passage of claim 1 wherein said radiation shielding material is concrete.

* * * * *